United States Patent [19]
Leung

[11] Patent Number: 5,822,594
[45] Date of Patent: Oct. 13, 1998

[54] NETWORK HUB INTERCONNECTION CIRCUITRY HAVING POWER RESET FEATURE

[75] Inventor: Tommy Y. Leung, San Jose, Calif.

[73] Assignee: Asante Technologies, Inc., San Jose, Calif.

[21] Appl. No.: 867,741

[22] Filed: Jun. 3, 1997

Related U.S. Application Data

[63] Continuation of Ser. No. 574,137, Dec. 18, 1995, Pat. No. 5,734,842.

[51] Int. Cl.$^6$ ............................ G06F 1/24; G06F 15/173; G06F 13/00
[52] U.S. Cl. ................ 395/750.01; 395/284; 395/200.53
[58] Field of Search ........................... 395/750.01, 284, 395/200.53, 200.5, 200.51, 830; 370/464; 361/679; 340/825.06

[56] References Cited

U.S. PATENT DOCUMENTS

| | | | |
|---|---|---|---|
| 5,038,320 | 8/1991 | Heath et al. ........................... | 395/830 |
| 5,404,460 | 4/1995 | Thomsen et al. ........................ | 395/829 |
| 5,477,176 | 12/1995 | Chang et al. ........................... | 327/143 |
| 5,623,610 | 4/1997 | Knoll et al. ............................ | 395/281 |
| 5,652,893 | 7/1997 | Ben-Meir et al. .................. | 395/750.02 |
| 5,764,151 | 6/1998 | Wu ........................................ | 340/635 |

*Primary Examiner*—Gopal C. Ray
*Attorney, Agent, or Firm*—Burns, Doane, Swecker & Mathis, LLP

[57] ABSTRACT

A circuit for interconnecting electrical components in a stacked arrangement through the use of connector elements. The circuit includes reset circuitry for automatically resetting the power-up sequence of the electrical components in the stack to allow the components to be powered up in any desired sequence. The circuit can also include identification circuitry for generating a unique identifier for each component in the stack and termination circuitry for selectively establishing terminal connections between the first and last components in the stack.

3 Claims, 2 Drawing Sheets

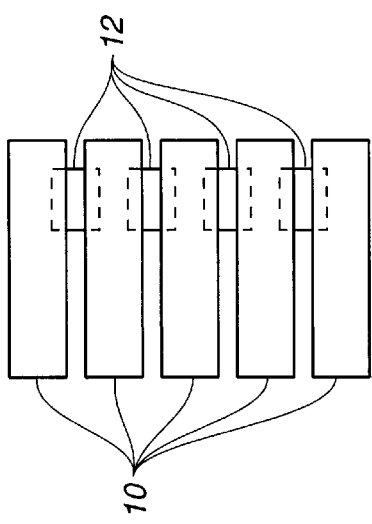
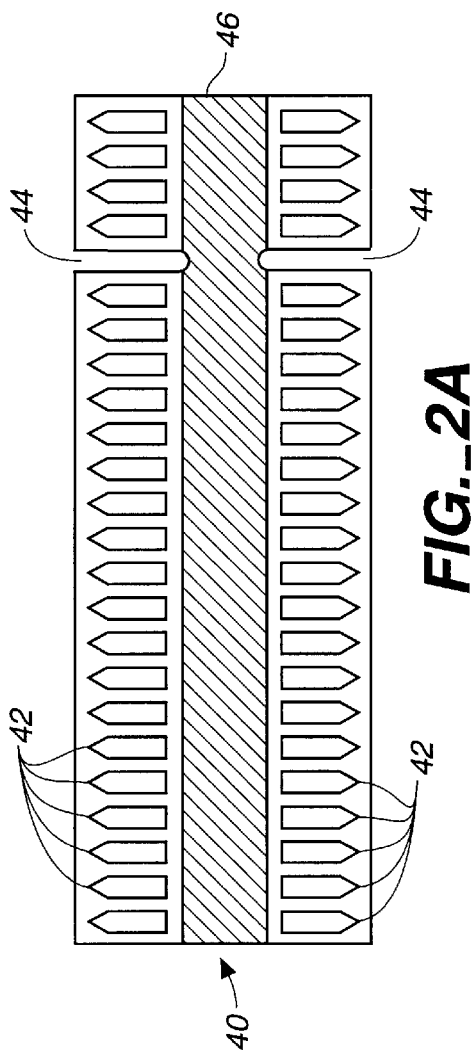
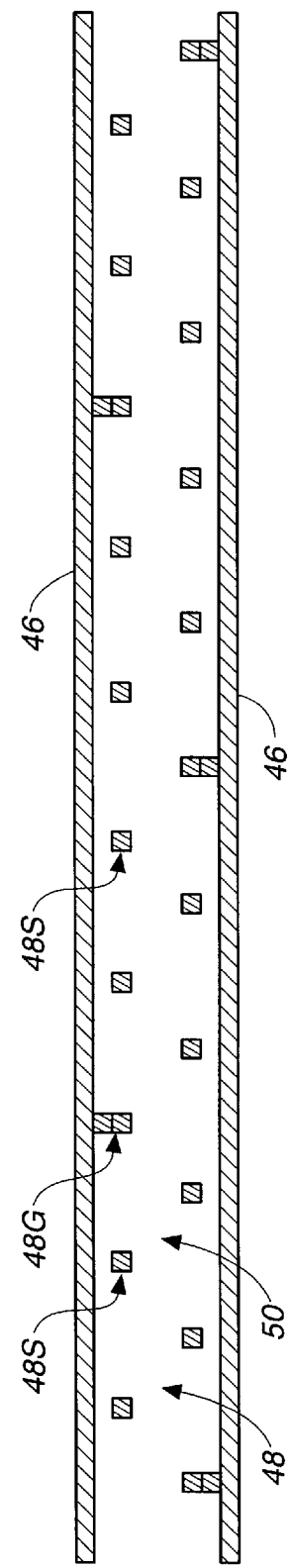
FIG._1
FIG._2A
FIG._2B

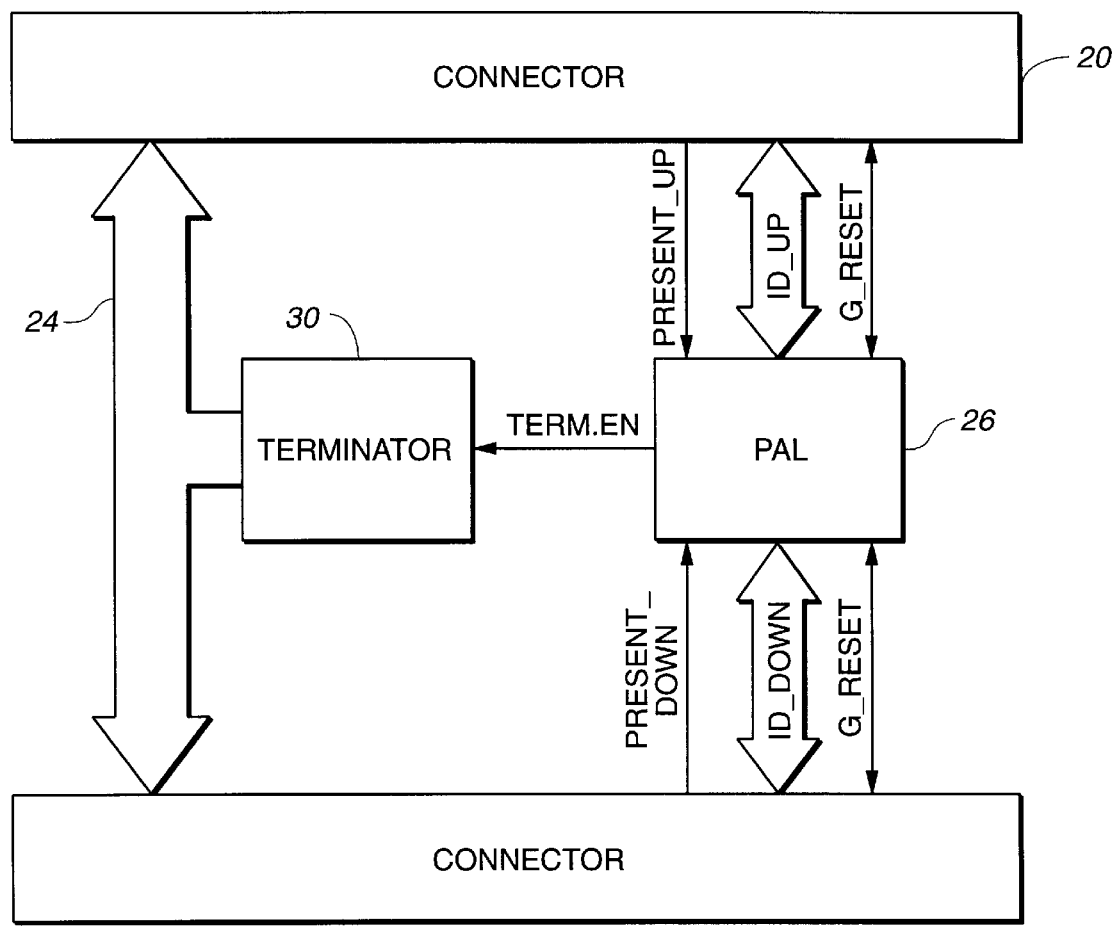
FIG._3
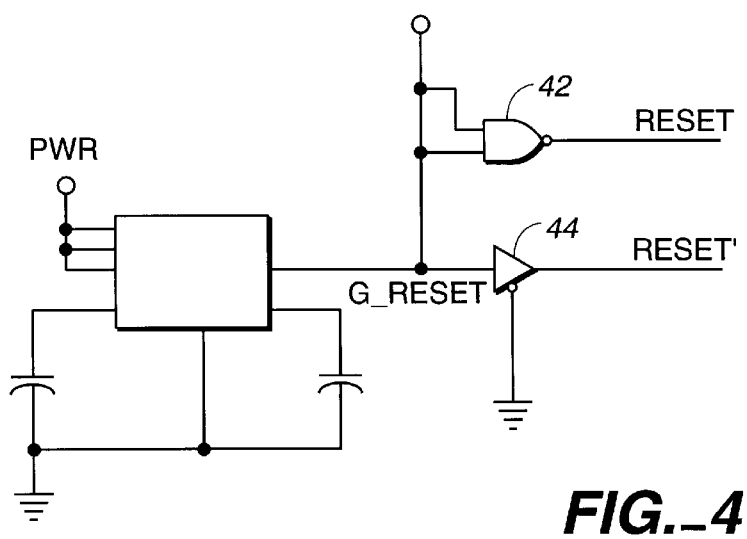
FIG._4

NETWORK HUB INTERCONNECTION CIRCUITRY HAVING POWER RESET FEATURE

This application is a continuation of application Ser. No. 08/574,137, filed Dec. 18, 1995, U.S. Pat. No. 5,734,842.

FIELD OF THE INVENTION

The present invention relates generally to hubs used to interconnect electrical components in a communications network. More particularly, the present invention relates to circuitry for interconnecting a group of hubs in a stacked configuration.

BACKGROUND OF THE INVENTION

In a communications network, large numbers of components such as computers, workstations, or file servers, are electrically connected by a communication network technology such as ethernet, asynchronous transfer mode (ATM), fiber distributed data interface (FDDI), a technology known as TP-PMD (a copper-wire derivative of FDDI), and a networking technology known as 100VG-AnyLAN, which uses an access method called demand priority access method (DPAM). An ethernet or other communication network typically includes a hub which is connected to the arrangement of components by communication cables, and which allows the computers, workstations, or file servers to exchange data signals. Data signals sent from a transmitting component to a receiving component are transmitted to the hub and repeated at the hub for transmission to the receiving component. The hub enables multiple computers, workstations, or file servers to share resources in a variety of applications. These applications include client-server database systems, in which a back-end database "engine" handles queries from multiple client front-ends running on desktop personal computers. The volume of data carried over the communication network escalates considerably as new users, new applications software, and more powerful computers or workstations are added to the network. As the volume of data carried over the network increases toward the maximum capacity, the data transfer rate through the hub and communication cables decreases, causing delays in computer applications and severely reducing the effectiveness of the network. Further, as the number of users associated with a network increases, more access ports are needed. To alleviate this problem, it is highly desirable to increase the capacity and/or the speed of the network.

A typical network hub includes one or more devices for routing data transfers between a number of ports (e.g., 12) in a workgroup. Each port may be assigned to one or more individual users or one or more individual computers, workstations, or servers. To increase the number of ports available to a workgroup, multiple hubs may be connected. Hub connections are typically achieved by uplink cables, such as unshielded twisted pair (UTP) cables, shielded twisted pair (STP) cables, or fiber optic cabling. In large, complex networks, a significant number of cables may be required. Cables present significant design limitations. For example, the total length of cable between hub units in a high-speed (e.g., 100 megabits per second) network must be less than 205 meters, and the total length of cable from a hub unit to a computer or other component must be less than 100 meters. Further, cables cause signal delay which can contribute to delays in network applications; thus, longer cables cause increased delay. In addition, signal reflection occurs at cable termination or connection points; thus, an increased number of cables causes increased delay. The reflected signals at the cable termination points contribute to signal degradation and inhibit network performance.

When a group of network hubs are stacked together to increase the capacity of a network, each hub in the arrangement typically must be powered up in a predetermined order (e.g., from the bottom to the top of a stack of hubs). If the hubs are not powered up in the prescribed order, network errors may result. Accordingly, it would be desirable for a communication network hub or other arrangement of electrical components to be easily configured and expanded without the concerns of signal reflection, propagation delay, and errors in the power-up sequence of the network.

SUMMARY OF THE INVENTION

To overcome the above problems, and provide other advantages, the present invention provides for an arrangement of electrical components, such as communication network hubs connected by connector elements, and a circuit for interconnecting electrical components such as network hubs in a communications network, each network hub including a reset means for automatically resetting the power-up sequence of a stacked arrangement of hubs. The reset means allows the network hubs to be powered up in any order.

The network hubs can be communication network hubs for exchanging communication signals between network devices such as computers, workstations, file servers, or other devices. According to exemplary embodiments, the hubs can include a plurality of substantially identical receiving slots for receiving connector elements to electrically connect two network hubs. The connector elements can include a dielectric connector body which is provided with electrical traces disposed on the connector body for cooperating with electrical contacts disposed in the receiving slots such that the electrical traces are brought into electrical contact with the electrical contacts when a connector element is inserted into a receiving slot. The connector element can also include an aligning means such as a slotted groove on the connector body which cooperates with an aligning element disposed in the receiving slot for ensuring the proper alignment of electrical traces and electrical contacts.

BRIEF DESCRIPTION OF THE DRAWINGS

A more complete understanding of the present invention will result from taking the following Detailed Description of Preferred Embodiments in conjunction with the attached drawings in which like reference numerals indicate like elements, and in which:

FIG. 1 is a diagram of an arrangement of interconnected network hubs according to an embodiment of the present invention;

FIGS. 2A–B are diagrams showing a perspective view and a cross-sectional view, respectively, of a connector element according to an embodiment of the present invention;

FIG. 3. is a block diagram of a circuit for interconnecting electrical components according to an embodiment of the present invention; and FIG. 4 is a schematic diagram of the reset circuitry according to an embodiment of the present invention.

DETAILED DESCRIPTION OF PREFERRED EMBODIMENTS

Referring now to FIG. 1, an arrangement of interconnected electrical components according to one embodiment of the present invention is shown. The electrical components are in the form of communication network hubs 10 arranged in a stack and connected by connector elements 12 such as those which will be described below with reference to FIG. 2. The hubs 10 are stacked together, and the hubs and connector elements 12 form a substantially continuous signal bus for conducting signals between the hubs 10 and between the network devices (not shown) connected to the hubs 10.

Referring now to FIG. 2A, a perspective view showing a face of a connector element 40 according to one embodiment of the present invention is shown. The connector element 40 has a substantially rectangular body, and electrical traces 42 are disposed on the connector element 40, such as by printing. The electrical traces 42 include ground traces and signal traces which are brought into electrical contact with ground contacts and signal contacts, respectively, of an electrical component when the connector element 40 is inserted into in the receiving slots provided in the electrical component. The connector element 40 can be provided with one or more slotted grooves such as slotted grooves 44. The slotted grooves 44 provide an aligning means to ensure that the ground traces and signal traces are brought into electrical contact with the appropriate ground contacts and signal contacts, respectively, when the connector element is inserted into a receiving slot of an electrical component. It will be appreciated that other suitable aligning means, such as bumps located on the surface of the connector element 40 or projections extending from the connector element 40, can be used instead of the slotted grooves 44. It will be further appreciated that the signal traces and ground traces comprising signal traces 42 may be arranged so that no aligning means is necessary. The connector element 40 can also be provided with a layer 46 of electrically conductive material located on a portion of each face of the connector element 40. The electrically conductive layer 46 serves as a grounding shield to protect the connector element from the effects of RF interference.

Referring now to FIG. 2B, a cross-sectional view of the connector element 40 is shown. The connector element 40 includes an inner layer 48 which contains electrically conductive signal leads 48G and 48S for appropriately conducting electrical signals between ground traces and between signal traces, respectively. Inner layer 48 is surrounded by a dielectric layer 50, on which the signal traces are printed on the edges of each surface of the dielectric layer 50. Signal leads 48G and 48S are appropriately connected between ground traces and signal traces, respectively, through dielectric layer 50. Conductive layers 46 are provided on portions of opposite surfaces of the connector element 40 as grounding RF shields. It will be appreciated that the connector element 40 is constructed so as to form a microstrip. It will be further appreciated that the dimensions of the dielectric layer 50 may be selected to ensure that the impedance of the connector element 40 matches the impedance of the driving circuits of the electrical components to be connected. By tuning the impedance of the connector element 40, signal reflection and degradation is significantly less than that in network hubs which use conventional cables. The arrangement of FIG. 1 and connector element of FIGS. 2A–B are described in more detail in applicant's copending, commonly assigned application entitled "CONNECTOR ELEMENT AND COMPONENT ARRANGEMENT FOR A STACKABLE COMMUNICATIONS NETWORK HUB", Ser. No. 08/565,911, filed Dec. 1, 1995, U.S. Pat. No. 5,645,434, which is incorporated herein by reference.

Referring now to FIG. 3, a functional block diagram of a circuit for interconnecting electrical components in an arrangement, such as the stacked arrangement of network hubs depicted in FIG. 1, is shown. The circuit of FIG. 3 is preferably contained in a network hub or other electrical component. The circuit includes a top connector 20, and a bottom connector 22, which are preferably connector elements of the type shown in FIG. 2. The connector elements can be connected by one or more busses such as bus 24 for communicating data and control signals. The circuit of FIG. 3 can also include programmable array logic (PAL) 26 which receives a PRESENT_DOWN signal and an ID_IN signal from bottom connector 22, and a PRESENT_UP signal from top connector 20. The PAL 26 provides an ID_UP signal to top connector 20, and generates a TERM_EN signal which is supplied to terminators 30 for establishing terminal connections between bus 24 and the network hub if the network hub is the first hub or last hub in a stack. The circuit further includes a reset line RESET for supplying a reset signal to automatically reset the power-up sequence of the stack. By automatically resetting the power-up sequence of the stack whenever a new hub is added, the hubs in the stack can be powered up in any order. The circuitry of FIG. 3 is present in each network hub or other electrical component in the stack or arrangement. Certain aspects of the circuitry of FIG. 3 are described in more detail in applicant's copending, commonly assigned application entitled "NETWORK HUB INTERCONNECTION CIRCUITRY", Ser. No. 08/567,580, filed Dec. 5, 1995, which is incorporated herein by reference.

Referring now to FIG. 4, a schematic diagram of a reset circuit according to an embodiment of the present invention is shown. A reset circuit such as that shown in FIG. 4 is present in each network hub in an arrangement. When a new network hub is added to an arrangement of hubs and powered up, power will be supplied to the circuit of FIG. 4 at terminals PWR. When power is received at terminals PWR, reset signal generator 40 generates a global reset signal on line G_RESET. This global reset signal on line G_RESET is transmitted to all of the network hubs in an arrangement as shown in FIG. 3. One or more of the signal traces on the connector element, as shown in FIG. 2A, may be used to transmit the global reset signal to each hub in the arrangement. Accordingly, each individual hub in the arrangement receives a global reset signal on line G_RESET, and includes NAND gate 42 and amplifier 44 for generating reset control signals RESET and RESET' to cause the individual hub to power up again. In a preferred embodiment of the present invention, reset signal generator can be implemented by a Power on Reset, such as a TL7705, available from Texas Instruments NAND gate 42 can be implemented by a 7414C132 NAND gate, and amplifier 44 can be implemented by a 74F125 amplifier. It will be appreciated that other suitable components and arrangement can be used for the reset circuit of FIG. 4.

While the foregoing description has included many details and specificities, it is to be understood that these are intended to illustrate the present invention and are not to be construed as limitations of the invention. Numerous modifications will be readily apparent to those of ordinary skill in the art without departing from the spirit and scope of the invention, as defined by the following claims and their legal equivalents.

What is claimed is:

1. A circuit for interconnecting network hubs, each network hub exchanging data signals between two or more devices in a network, the circuit comprising:

identifier means associated with each hub for automatically assigning an identifier to each hub;

termination means for automatically configuring electrical connections to terminal hubs as terminal connections; and reset means for automatically resetting a power-up sequence used to provide power to each of the hubs when a new hub is added.

2. The circuit of claim 1, wherein the reset means includes a means located in the new hub for generating a global reset signal when the new hub is added to the stack; means located in each hub for receiving a global reset signal and causing the power-up sequence to be restarted.

3. The circuit of claim 2, wherein the identifier means and termination means are implemented by programmable array logic.

\* \* \* \* \*